United States Patent
Loef et al.

(10) Patent No.: US 7,973,496 B2
(45) Date of Patent: Jul. 5, 2011

(54) RESONANT DRIVER WITH LOW-VOLTAGE SECONDARY SIDE CONTROL FOR HIGH POWER LED LIGHTING

(75) Inventors: Christoph Loef, Aachen (DE); Matthias Wendt, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 313 days.

(21) Appl. No.: 12/377,535

(22) PCT Filed: Aug. 29, 2007

(86) PCT No.: PCT/IB2007/053474
§ 371 (c)(1),
(2), (4) Date: Feb. 16, 2009

(87) PCT Pub. No.: WO2008/029325
PCT Pub. Date: Mar. 13, 2008

(65) Prior Publication Data
US 2010/0277095 A1 Nov. 4, 2010

(30) Foreign Application Priority Data
Sep. 7, 2006 (EP) .................. 06120243

(51) Int. Cl.
*G05F 1/00* (2006.01)
(52) U.S. Cl. ........ 315/297; 315/294; 315/277; 315/244; 315/315; 315/312; 363/21.02; 363/21.01; 363/21.07; 363/67
(58) Field of Classification Search .............. 315/209 R, 315/224, 244, 246, 247, 255, 258, 277, 283, 315/272, 294, 297, 307, 312, 315; 363/15–17, 363/19, 21.01–21.03, 21.06, 21.07, 21.15, 363/67, 69; 307/31, 113, 126
See application file for complete search history.

(56) References Cited

U.S. PATENT DOCUMENTS

| | | | |
|---|---|---|---|
| 5,783,909 A | 7/1998 | Hochstein | |
| 6,369,525 B1 | 4/2002 | Chang et al. | |
| 6,430,064 B1 | 8/2002 | Tsuchimoto et al. | |
| 6,822,881 B2 * | 11/2004 | Elferich | 363/21.02 |
| 6,847,169 B2 | 1/2005 | Ito et al. | |
| 7,285,875 B2 * | 10/2007 | Yasumura | 307/127 |
| 7,518,263 B2 * | 4/2009 | Gan et al. | 307/32 |
| 7,746,671 B2 * | 6/2010 | Radecker et al. | 363/21.03 |
| 7,830,685 B2 * | 11/2010 | Wagner et al. | 363/65 |
| 2003/0067791 A1 | 4/2003 | Elferich et al. | |
| 2005/0225176 A1 | 10/2005 | Gan et al. | |
| 2006/0077600 A1 | 4/2006 | Yasumura | |

FOREIGN PATENT DOCUMENTS

| | | |
|---|---|---|
| EP | 1608053 A1 | 12/2005 |
| WO | 2005036726 A1 | 4/2005 |
| WO | 2007102106 A2 | 9/2007 |

* cited by examiner

Primary Examiner — Haissa Philogene

(57) ABSTRACT

The present invention relates to a power supply device for supplying power to a load, preferably a LED, comprising a first circuitry (12) with an inverter unit (24) adapted to provide an AC voltage, preferably a rectangular voltage, and a resonant circuit (30) with a capacitance (32) and an inductance (34), a second circuitry (14) with a rectifier unit (42), a switch (64) and said load (60), said switch being adapted to switch said load on and off, a controller unit (16) adapted to control said switch (64) as to adjust the power provided to said load (60) without any measurement signal from said primary circuitry (12), and a transformer (18) with a primary side (20) and a secondary side (22), said primary side being connected to said first circuitry (12) and said secondary side (22) being connected to said second circuitry (14), preferably said rectifier, so that said first and second circuitries are galvanically isolated.

12 Claims, 3 Drawing Sheets

RESONANT DRIVER WITH LOW-VOLTAGE SECONDARY SIDE CONTROL FOR HIGH POWER LED LIGHTING

This application is a national stage application under 35 U.S.C. §371 of International Application No. PCT/IB2007/053474 filed on Aug. 29, 2007, and published in the English language on Mar. 13, 2008 as International Publication No. WO/2008/029325, which claims priority to European Application No. 06120243.8, filed on Sep. 7, 2006, incorporated herein by reference.

FIELD OF THE INVENTION

The present invention relates to a power supply device for supplying power to a load, preferably a light emitting diode (LED).

BACKGROUND OF THE INVENTION

Generally, solid-state lighting is of growing interest for residential, automotive and professional applications. Since solid-state lamps, such as LEDs, cannot be supplied from a battery or the AC mains directly, electronic power drivers (also called power supply devices) are needed for power effective driving. For efficiency reasons, LED drivers have to be operated in a switched mode. The drivers convert the available DC or AC voltage into a DC current supplied to the LEDs. The electronic driver has to provide a DC output current which is independent of variations of the input voltage source and of voltage drops at the LEDs. In most applications galvanic isolation is another important requirement for LED drivers.

Power supplies for supplying LEDs and other loads, are for example known from US 2005/0225176 A1, US 2003/0067791 A1, US 2006/0077600 A1 or WO 2005/036726.

Generally, switched mode power supplies generate a DC output voltage, wherein in most cases the output voltage is controlled by pulse width modulation (PWM). To use this driver concept within LED lighting systems, a current controller unit including a current sensor has to be added. For galvanic isolating driver circuits, the current has to be measured on the secondary side while the PWM control and the transistors are located on the primary side. This causes additional effort since an auxiliary voltage is needed on the secondary side and galvanic isolation has to be foreseen in the feed back path. If the current measurement is based on a cheap and simple shunt resistor additional losses occur.

Another problem of this known concept can be seen in EMI (electromagnetic interference) distortion typically related to PWM switching topologies.

SUMMARY OF THE INVENTION

In view of the above it is an object of the present invention to provide a power supply device which overcomes the deficiencies of prior art devices. Particularly, the EMI should be minimized and switching losses should be avoided. Moreover, a further object is to provide a cost-effective power supply without giving up galvanic isolation and power control of the load.

This and further objects of the present invention are solved by a power supply device for supplying power to a load, comprising a first circuitry with an inverter unit adapted to provide an AC voltage, preferably a rectangular voltage, and a resonant circuit with a capacitance and an inductance, a second circuitry with a rectifier unit, a switch and said load, said switch being adapted to switch said load on and off, and controller unit adapted to control said switch as to adjust the power provided to the load without any measurement signal from said primary circuitry, and a transformer with a primary side and a secondary side, said primary side being connected to said first circuitry and said secondary side being connected to said second circuitry, preferably said rectifier, so that said first and second circuitries are galvanically isolated.

The inventive power supply device provides a novel resonant operating galvanic isolating driver topology and control scheme for supplying loads, preferably LEDs. The device can be supplied by a DC voltage, which may be given by the rectified and smoothed mains voltage. The inventive device comprises an inverter, preferably a high-frequency inverter, a transformer, a series capacitor and a secondary rectifier stage. The transformer serves for galvanic isolation and adapts the voltage level, e.g. from 300 volt primary to 30 volt secondary. The resonant circuit is preferably formed by the stray inductance of the transformer and the series capacitor. Thus, the parasitic leakage inductance of the transformer is part of the device. Contrary to known PWM-based converters such as forward and fly back topologies, the leakage inductance does not need to be minimized. This is of advantage for the isolation and winding design and it thus keeps the cost low.

Power, supplied to the load is controlled at the secondary low voltage side of the transformer. The number of on-states versus the number of off-states of the switch in the second circuitry determines the average output to the load.

One of the advantages of the inventive device is that the current becomes sinusoidal and it is zero at the switching instance. This avoids switching losses and minimizes EMI. Further, the nominal output voltage supplied to the second circuitry can be set by the turn ratio of the transformer according to the desired characteristic of the load. Further, the power supply device according to the present invention is very suitable for mains supply. Further, the controller unit does not need any signal/feedback from the primary circuitry to adjust the power, i.e. the current supplied to the load. There is no "information transfer" between the primary and the secondary circuitry necessary.

A further advantage of the power supply device of the present invention is that no additional expensive DC smoothing capacitor is required to smoothen the load voltage. This increases the expected lifetime because the buffer capacitors are often the weakest elements regarding lifetime.

In a preferred embodiment, said controller is adapted to operate said switch in the current zero crossing.

The advantage of this measure is that switching losses are minimized or avoided.

In a further preferred embodiment, said controller comprises a current measurement element provided in the second circuitry.

This measure has the advantage that the current control is done in the second circuitry and hence at a low voltage level.

In a further preferred embodiment, said load comprises a plurality of LEDs connected in series in a first branch, wherein said switch lies in said first branch for switching said plurality of LEDs on and off.

The advantage of this measure is that a plurality of LEDs may be controlled by one switch.

In a preferred embodiment, at least one further branch comprising at least one LED and at least one further switch for switching said LED is provided parallel to said first branch.

This measure allows to increase the flexibility of the power supply device, particularly in terms of controllability of the LEDs.

In a further preferred embodiment, each branch comprises a resistor in series with said LED and said switch.

This measure has the advantage that an over-current guard is provided.

In a preferred embodiment, the at least one switch is a transistor switch (e.g. a bipolar transistor or a MOSFET) preferably driven in a linear region for overcurrent protection. More preferably, said transistor switches are driven in a linear region for current balancing between synchronously operating LEDs of the different branches.

This measures have proven advantageous in practice.

In a preferred embodiment, said first circuitry comprises multiple resonant circuits connected parallel to each other, each resonant circuit comprising the primary side of a transformer, wherein the secondary side of each transformer is connected with a single branch of the second circuitry.

In other words, each branch comprising a series connection of one or more LEDs and a switch and is assigned one transformer.

This measure has the advantage that the flexibility of the power supply is enhanced. Particularly, by employing different winding turn ratios for the transformer, the nominal voltage supplied to the branches can be different.

In a further preferred embodiment said first circuitry comprises a current sensing element for sensing the current and transmitting the sensed current signal to the inverter. Preferably, said inverter is adapted to provide AC voltage and current both having identical signs.

This measure has the advantage that switching losses may be avoided and EMI may be minimized. As a result, the resonance frequency can be very high so that it is possible to use small transformers.

In a preferred embodiment, the inverter is mechanically separated from the transformer and the resonant circuit.

This measure has the advantage that the device may be used for moveable mains supplied illumination products.

In a further preferred embodiment, the inverter unit is adapted to switch-off the output, preferably for some resonant cycles, if an over-current is detected by said current sensing element.

This measure has the advantage that the circuitries and the transformer may be protected against over-loads.

According to a further embodiment, said current measurement element is adapted to detect the voltage across the switch during its on-state.

This measure has the advantage that a simple and hence cost-effective element for measuring the current can be provided.

Further features and advantages can be taken from the following description and the enclosed drawings.

It is to be understood that the features mentioned above and those yet to be explained below can be used not only in the respective combinations indicated but also in other combinations or in isolation, without leaving the scope the present invention.

BRIEF DESCRIPTION OF THE DRAWINGS

An embodiment of the invention is shown in the drawings and will be explained in more detail in the description below with reference to same. In the drawings.

DETAILED DESCRIPTION OF THE PREFERRED EMBODIMENT

Figure 1:
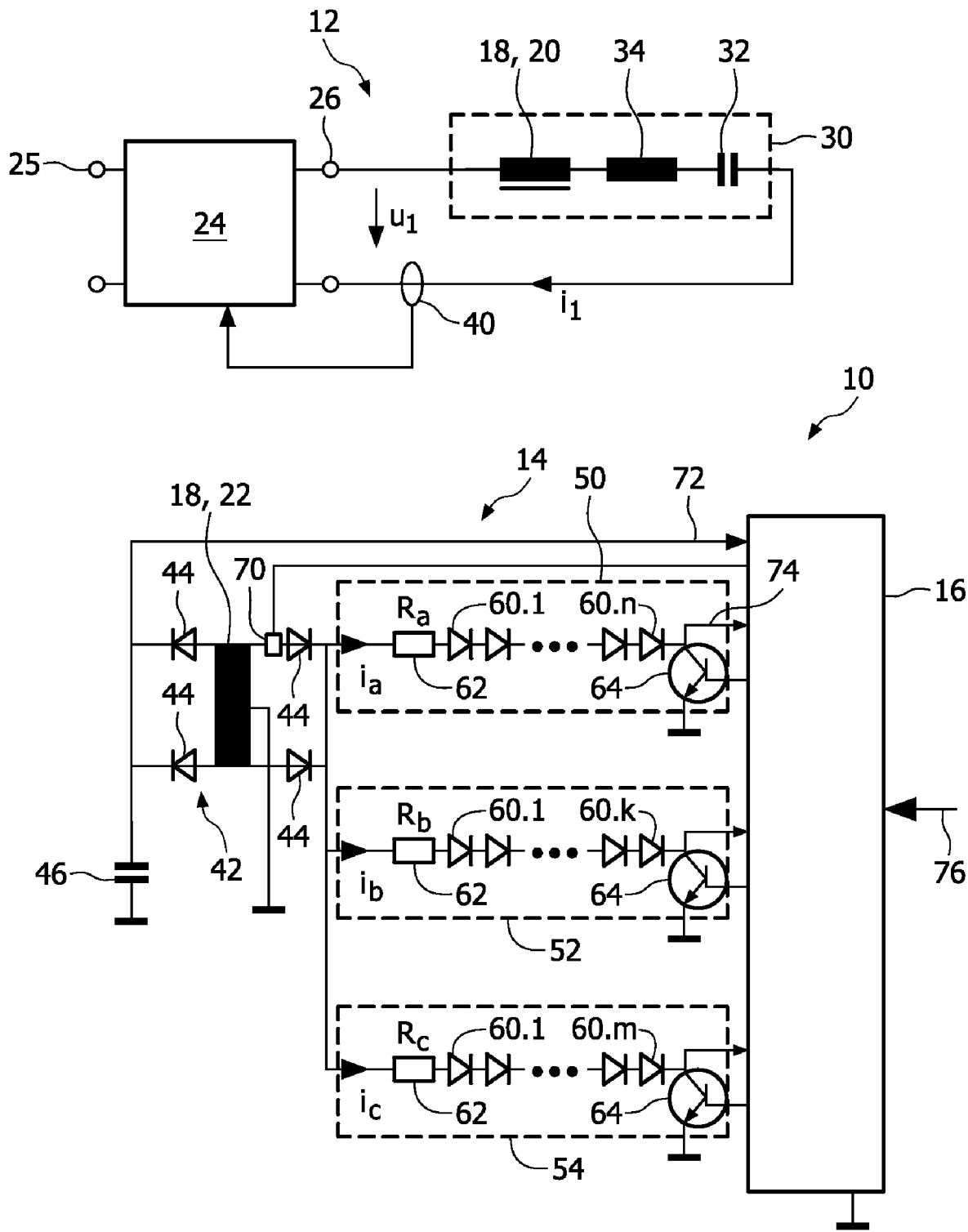
FIG. 1 is a block-diagram of a power supply device according to a first embodiment of the invention.
Figure 2:
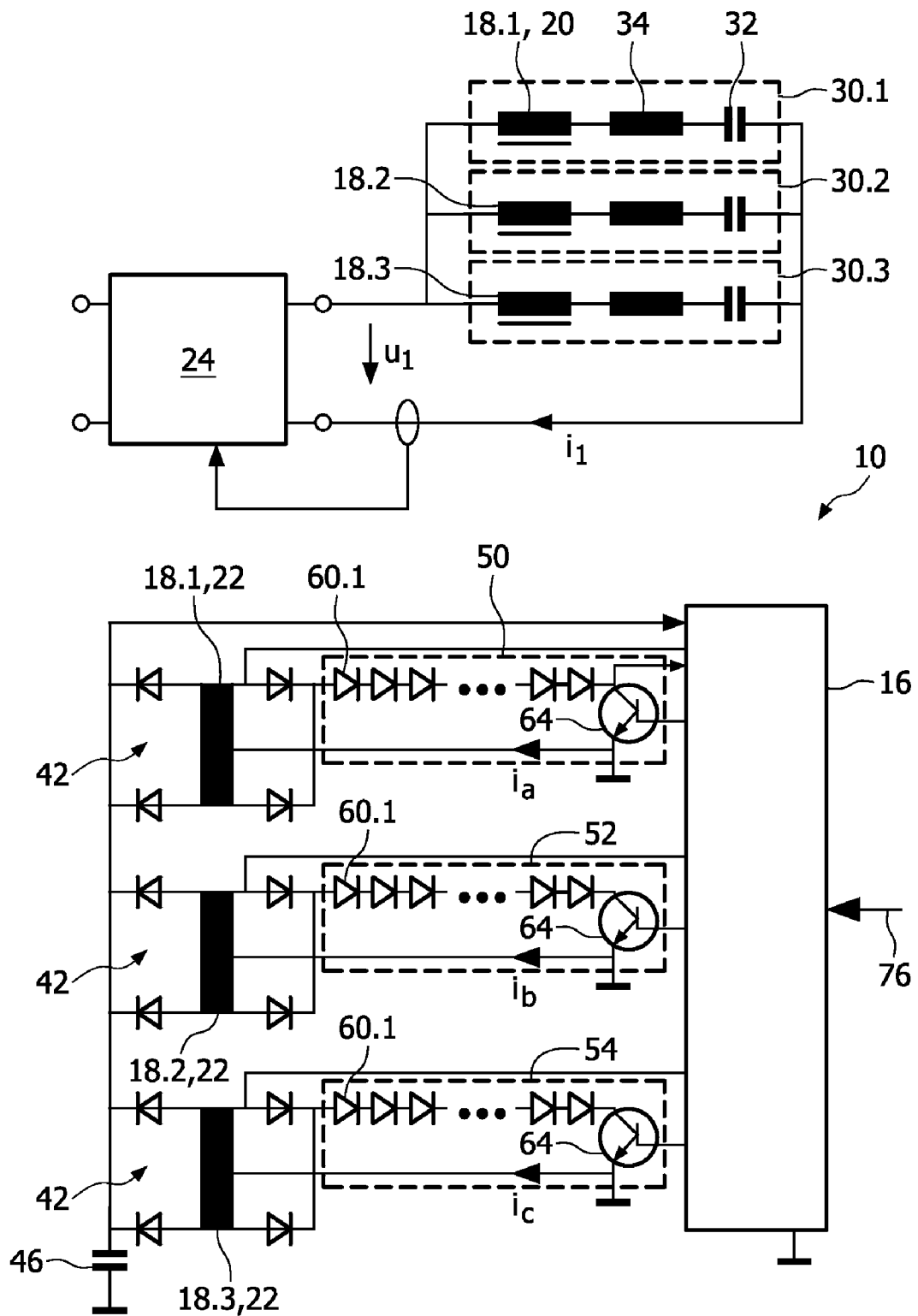
FIG. 2 is a block-diagram showing a power supply device according to a second embodiment of the invention.

In FIGS. 1 and 2, two embodiments of a power supply device are shown as block-diagrams. The power supply device is used for supplying a load, preferably a lamp with power, wherein the power is adjustable. The lamp is preferably a light emitting diode (LED) or a plurality of such LEDs, for example connected in series. However, it is to be noted that other electrical loads, preferably other types of lighting systems may also be supplied with the power supply device of the present invention. Here, the term "LED" comprises also organic LEDs (OLED).

Further, it is to be noted that variations and modifications to the devices shown in FIG. 1 or 2 may be carried out without leaving the scope of the present invention as defined in the appended claims.

In FIG. 1, the general structure of a power supply device is shown and indicated with reference numeral 10. The power supply device 10 comprises a first circuitry 12 and a second circuitry 14 which are galvanically isolated from each other.

The galvanic isolation is achieved by a transformer 18 having a primary side 20 with a primary winding assigned to the first circuitry and a secondary side 22 with a secondary winding assigned to the second circuitry 14.

The first circuitry 12 comprises an inverter unit 24 with two input terminals 25 and two output terminals 26.

The inverter unit 24 is adapted to provide a high frequency AC voltage at the output terminals 26. The frequency of the output voltage may be in the range of 100 kHz or more.

The inverter unit 24 receives a DC voltage at the input terminals 25. However, it is also possible that the inverter unit 24 receives an AC voltage, e.g. the AC mains.

The general structure of such a high frequency AC inverter unit 24 is known for a skilled person and will therefore not be described in detail hereinafter. Between both output terminals 26 a resonant circuit 30 is connected. The resonant circuit 30 comprises the primary side (primary winding) of the transformer 18, a capacitor 32 and an inductor 34. These parts are connected in series.

Although a separate inductor 34 is shown in FIG. 1, this inductor 34 may be provided by the stray inductance of the transformer.

The first circuitry further comprises a current detector 40 adapted to detect the current $I_1$ flowing between both output terminals 26. The respective signal of the current detector 40 is supplied as a control signal to the inverter unit 24.

Figure 3A:
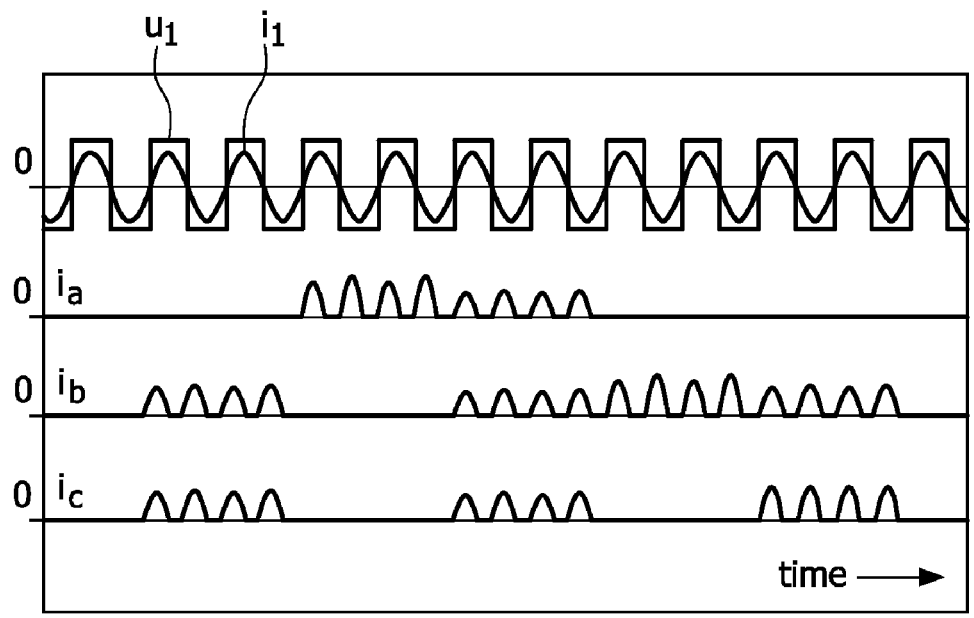
FIG. 3a diagram showing the current and voltage envelopes of the device of FIG. 1.
Figure 3B:
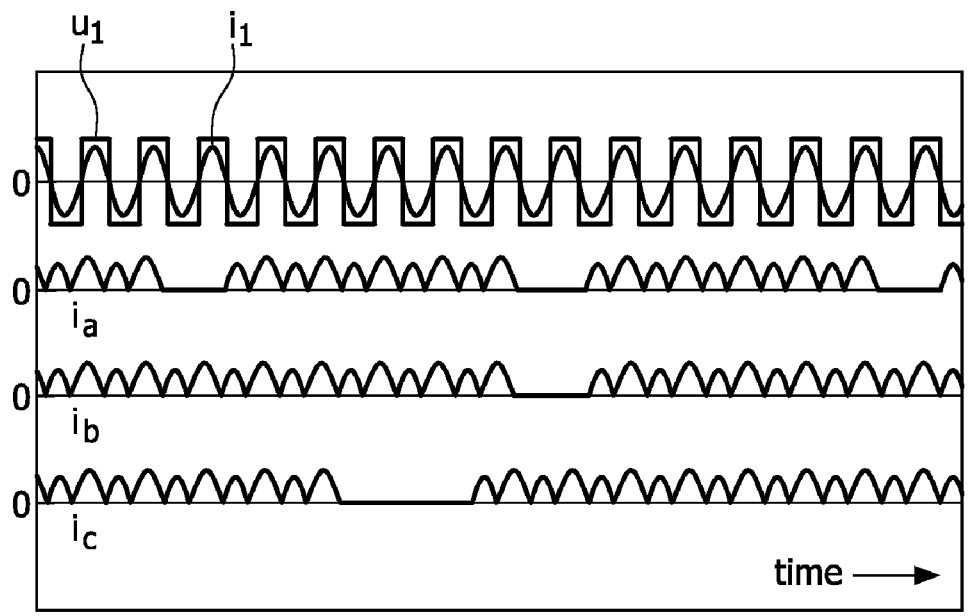
FIG. 3b diagram showing the current and voltage envelopes of the device of FIG. 2.

As shown in FIG. 3a, the inverter unit 24 provides a rectangular voltage $U_1$ between both output terminals 26. As also shown in FIG. 3a, the sign of the rectangular output voltage is identical to the sign of the output current which itself is sinusoidal. As to keep the output voltage sign identical to the output current sign, the current is measured by the current detector 40.

As already mentioned above, the structure of the inverter 24 is known for a skilled person. It may be realized by means of a half bridge or a full bridge inverter has to mention just two examples.

The resonant frequency of the resonant circuit 30 is determined by the resonant capacitor and the total resonant inductance. The resonance impedance of the resonant circuit 30 acts as a series resistance and limits the primary and secondary winding current in the transformer 18.

The second circuitry 14 comprises the secondary side (secondary winding) 22 of the transformer 18 supplying an AC voltage to a rectifier 42. The rectifier 42 comprises four diodes 44 connected in a full bridge formation. The rectified voltage is supplied to an input side of one or more branches 50, 52, 54, the output side of which are coupled with ground. In the embodiment shown in FIG. 1, three branches 50, 52, 54 are shown. However, it is to be noted that the number of branches may vary dependent on the application. The general structure of each branch 50, 52, 54 is similar so that the same reference numerals are used to indicate same parts.

One branch 50, 52, 54 comprises at least one light emitting diode (LED) 60.1-60.n and a switch 64 as well as a resistor 62. All members, namely the resistor 62, the LEDs 60 and the switch 64 are connected in series between the input side and the output side of the branch. The number of LEDs 60.1-60.n depends on the application and may range from 1 to 10 or more.

The switch 64 is provided as a transistor, preferably a npn bipolar transistor. However, other switches may also be used, e.g. thyristors. However, the used switch 64 must be controllable by a control signal, which—in the present embodiment—is supplied to the base of the transistor. In the present embodiment, the collector of the transistor is connected with the cathode of the LED 60.n and the emitter of the transistor is connected with the output side of the branch and hence with ground.

The LEDs 60.1-60.n may be switched on and off by operating the switch 64. The respective operation of the switch 64 is done by a control unit 16 generating a control signal and supplying it to the respective switch 64. The control signal supplied to the switch 64 may be generated on the basis of a general control signal 76 supplied to the control unit 16 or on the basis of any other program or algorithm stored in the control unit 16.

It is to be noted that the power supplied to the LEDs 60.1-60.n and hence the light output of these elements may be adjusted by the number of on-cycles vs. the number of off-cycles of the switch 64. The longer the on-cycle of the switch 64 per time unit the higher is the light output of the LEDs.

It is to be noted that the LEDs 60.1-60.n of the branch 50 may not be switched on and off independently from each other. Rather, the LEDs 60.1-60.n are switched on and off simultaneously so that the light output of each LED of a branch is similar.

However, since the plurality of branches 50, 52, 54 are connected between the output of the rectifier 42 and ground in parallel, the light output of the LEDs of the branches may be adjusted independently. This may be achieved by different numbers of on-cycles and off-cycles of the switches 64 of different branches 50, 52, 54.

As shown in FIG. 1, each branch 50, 52, 54 comprises a resistor 62 which serves as an overcurrent guard and for current balancing between parallel connected LED strength. Alternatively, the switches 64 of the branches may be driven in a way that though driving them in the linear region a maximum current is guaranteed and the current is balanced between series connected LEDs of the branches 50-54.

The controller 16 generates control signals for the switches 64 on the basis of a current detection signal provided by a current detector 70. This current detector 70 detects the total current supplied to the branches 50-54. The control signals are generated such that the switches are operated when the current is close to zero so that the switching losses are minimized.

It is further shown in FIG. 1 that the controller 16 is supplied with power from the secondary winding of the transformer 18 via line 72. The AC voltage across the secondary winding of the transformer is rectified by diodes 44 and is smoothed by a capacitor 46 so that the voltage supplied via line 72 to the controller is a DC voltage. A further advantage of this voltage supply is that a minimum load is applied to the secondary winding of the transformer even if all LEDs are turned off. Thus a voltage overshoot caused by resonance effects at the secondary winding of the transformer will be avoided.

The inverter unit 24 may be mechanically separated from the transformer 18 and the rest of the resonant circuit 30 which may be useful for movable mains supplied illumination products.

Further, the current detection by the current detector 40 in the first circuitry can be used to detect an overcurrent in the circuitry so that the inverter unit 24 can switch off the power supply for a short time, e.g. some resonant cycles, in response thereto. After this time, the resonant circuit can be turned on again.

As a further optional measure, the current in each branch 50, 52, 54 can be measured and supplied to the controller 16. In FIG. 1, the current is evaluated by the controller 16 by means of the voltage across the switch 64 during its on-state. The respective line supplying this voltage to the controller 16 is indicated with reference numeral 74 in FIG. 1. However, as an alternative, a series shunt resistor can be applied in the branch to detect the LED current value.

The power supply device 10 can be used for example for powering signaling lamps, decorative lamps, wall flooding, LCD backlighting and general illumination lamps, particularly LEDs. However, it is to be noted that this listing of potential applications is not exhaustive.

It is also to be mentioned that the ratio of the primary and secondary winding turns is selected according to the voltage needed in the second circuitry for powering the LEDs. The greater the number of LEDs in each branch the higher the nominal voltage supplied by the secondary side of the transformer must be.

In FIG. 2, a further embodiment of a power supply device is shown and indicated with reference numeral 10. Since the structure of this power supply device 10 is very similar to that of FIG. 1, like numerals are used for like parts. The main difference between both embodiments is that the second embodiment according to FIG. 2 comprises multiple resonant circuits 30.1-30.3 connected in parallel to each other. Each resonant circuit 30 comprises the primary winding turns of a transformer, an inductance 34 and a capacitor 32.

In the second circuitry, each branch 50, 52, 54 is assigned a secondary side of a transformer 18.1, 18.2, 18.3.

This embodiment allows to power the branches 50, 52, 54 with different voltages provided by the different transformers 18.1-18.3.

Hence, the flexibility of the LED control is enhanced.

Nevertheless, the structure and the function of each branch 50, 52, 54 is similar to the branch discussed in detail with reference to FIG. 1 so that it is not necessary to describe the structure and function again.

To briefly summarize, the present invention provides a power supply device which allows to power LEDs in a controllable manner without the necessity to feed a current signal information from the second circuitry back to the first circuitry. Particularly, the power control is achieved by the switches in the second circuitry, whereas the first circuitry supplies an AC voltage having a fixed frequency, namely the resonance frequency of the resonant circuit. Since the switches are switched on and off when the current is near zero or zero, the switching losses are minimal. Moreover, since the switches are in the second circuitry being operated with a low voltage, the requirements and hence the costs for such switches are lower compared to switches used in the first circuitry.

The invention claimed is:

1. A power supply device for supplying power to loads, the device comprising
   (a) two or more transformers, each having a primary side and a secondary side;
   (b) a first circuitry comprising:
      i. an inverter unit for providing an AC voltage, and
      ii. two or more resonant circuits connected parallel to each other, each resonant circuit comprising a capacitance, and an inductance and being connected to the primary side of the transformer;
   (c) a second circuitry comprising two or more branches, each branch comprising a rectifier unit, a switch, and a load and being connected to the secondary side of a single transformer of the two or more transformers such that said first and second circuitries are galvanically isolated, said switch being configured to switch said load on and off, and
   (d) a controller unit for controlling said switches of said second circuitry as to adjust the power provided to said loads without any measurement signal from said first circuitry.

2. The device according to claim 1, wherein said controller unit is configured to operate said switches in a current zero crossing.

3. The device according to claim 1, wherein said second circuitry comprises a current measurement element.

4. The device according to claim 1, wherein said controller unit is configured to evaluate a current by means of a voltage across a switch during its on-state.

5. The device according to claim 1, wherein each of said loads comprise a plurality of LEDs connected in series.

6. The device according to claim 5, wherein each branch comprises a resistor connected in series with said LEDs and said switch.

7. The device according to claim 5, wherein the switches are transistor switches driven in a linear region for over-current protection.

8. The device according to claim 7, wherein said transistor switches are driven in a linear region for current balancing between synchronously operating LEDs of the different branches.

9. The device according to claim 1, said first circuitry comprises a current sensing element for sensing a current and transmitting the sensed current signal to the inverter unit.

10. The device according to claim 1, wherein said inverter unit is configured to provide said AC voltage and a current both having identical signs.

11. The device according to claim 1, wherein said inverter unit is mechanically separated from the transformers and the resonant circuits.

12. The device according to claim 11, wherein said inverter unit is configured to switch-off an output when an over-current is detected by a current sensing element.

* * * * *